United States Patent
Malone et al.

(10) Patent No.: US 6,349,298 B1
(45) Date of Patent: *Feb. 19, 2002

(54) COMPUTERIZED HANDBOOK OF PROCESSES

(75) Inventors: Thomas W. Malone, Weston, MA (US); Kevin Crowston, Ann Arbor, MI (US); Jintae Lee, Honolulu, HI (US); Brian Pentland, Los Angeles, CA (US); Chrysanthos Dellarocas, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,944

(22) Filed: May 5, 2000

Related U.S. Application Data

(63) Continuation of application No. 09/143,795, filed on Aug. 31, 1998, now Pat. No. 6,070,163, which is a continuation of application No. 08/920,629, filed on Aug. 27, 1997, now Pat. No. 5,819,270, which is a continuation of application No. 08/681,620, filed on Jul. 29, 1996, now abandoned, which is a continuation of application No. 08/256,288, filed as application No. PCT/WO94/19742 on Feb. 25, 1994, now abandoned.

(30) Foreign Application Priority Data

Feb. 25, 1993 (GB) .............................................. 9303873

(51) Int. Cl.[7] .............................................. G06F 17/30

(52) U.S. Cl. ..................... 707/7; 707/2; 707/3; 707/4; 707/100; 707/104.1; 705/1; 709/201; 345/762; 345/968

(58) Field of Search ............................... 707/7, 2, 3, 4, 707/100, 104.1; 705/1; 709/201; 345/762, 968

(56) References Cited

U.S. PATENT DOCUMENTS 5,241,671 A * 8/1993 Reed et al. ................. 707/104
5,787,417 A * 7/1998 Hargove ......................... 707/4
5,819,270 A * 10/1998 Malone et al. ................ 707/7

* cited by examiner

Primary Examiner—Jack Choules
Assistant Examiner—Cheryl Lewis
(74) Attorney, Agent, or Firm—Wolf, Greenfield & Sacks, P.C.

(57) ABSTRACT

A computer system for displaying representations of processes, including models of complex business transactions in an information management system. The system includes a memory for storing the representations of the processes. The representation of a process is decomposed.

Additionally, specializations of the process are represented. Alternatively, the dependencies among processes in a decomposition are indicated along with associated coordination processes. An indication of where a process is used within another process may also be provided. Specializations may also be bundled together to allow for evaluation of alternatives within a bundle.

1 Claim, 20 Drawing Sheets

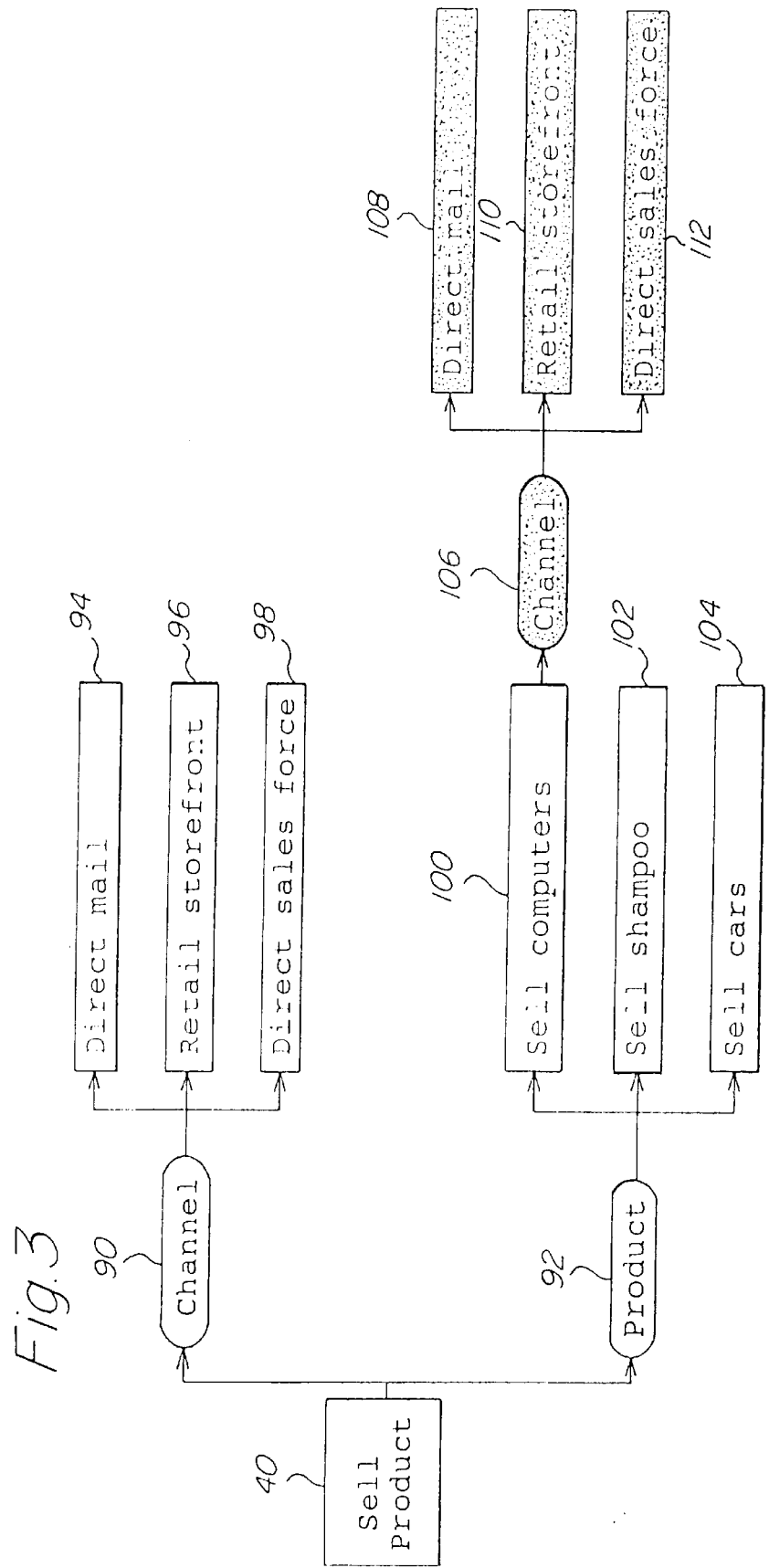

Fig.5

| Dependency (130) | Examples of coordination processes for managing dependency (132) |
|---|---|
| Shared resources (134) | "First come/first serve", priority order, budgets, managerial decision, market-like bidding (136) |
| Task assignments (138) | (same as for "Shared resources") |
| Producer-consumer relationships (140) | |
| Prerequisite (142) | Notification, sequencing, tracking (150) |
| Transfer (144) | Inventory management (e.g., "Just In Time", "Economic Order Quantity") (152) |
| Usability (146) | Standardization, ask users, participatory design |
| Design for manufacturability | Concurrent engineering |
| Simultaneity constraints | Scheduling, synchronization |
| Task/subtask | Goal selection, task decomposition, delegation |

COMPUTERIZED HANDBOOK OF PROCESSES

GOVERNMENT INTERESTS

The United States Government has certain interests in this application via grants from the National Science Foundation. This is a continuation of Ser. No. 09/143,796 filed Aug. 31, 1998 which is a continuation Ser. No. 08/920,629 filed Aug. 27, 1997 which is a continuation of Ser. No. 08/681, 620 filed Jul. 29, 1996, which is a continuation of Ser. No. 08/256,288 filed Jun 27, 1994, which is a continuation PCT/W094/19742 filed Feb. 25, 1994.

FIELD OF THE INVENTION

This invention is generally related to computer systems for representing processes. It is more particularly related to database systems for storing and utilizing computerized representations of processes to assist enterprise modeling, developing workflow software, process re-engineering, understanding and analysis of processes and relations between alternative processes. This application is related to U.K. patent application Ser. No. 9303873.5, filed Feb. 25, 1993 which is hereby expressly incorporated by reference.

BACKGROUND OF THE INVENTION

Organizations continually strive for improvement in their processes. However, such improvement is dependent on the extent of understanding of successful processes, including possible alternative processes and their interrelationships. Because there is little systematic theoretical or empirical foundation to assist understanding of processes, the development of improved processes is hindered.

Developing a systematic theoretical or empirical foundation for understanding processes involves developing a representation of processes, in combination with a method and system for viewing the representation, which enables one to compare alternative ways to perform a task, to compare a task to similar tasks and to judge which alternative processes are likely to be useful for accomplishing the task.

Much work is available concerning representation of computer processes. Processes for computer systems are commonly represented using flow charts, data flow diagrams, state transition diagrams (which define finite state machines, push down machines, or even Turing machines). Petri nets, and specialization.

A flow chart represents a process as a series of steps, with arrows between them, which represents an order in which the steps are to be performed. Some of the steps are decision points, so depending on the circumstances, different sets of steps might be performed. A data flow diagram is similar but represents how modules of a system are interconnected to perform the steps of a process but focuses on the ordering relationships imposed by the fact that data produced by some modules is used by other modules.

A state transition diagram represents a process in terms of the possible states of the system. The steps taken in the state to another. The most powerful representation which included a state transition diagram is a Turing machine, which can be used to describe any computer executing any computer program written in any computer programming language. A Petri net is similar to a finite state machine, but allows multiple states to be marked simultaneously. Transitions between states may be synchronized, since multiple states have to be marked at the same time for a particular transition to occur.

Significant developments have also been made in computer representation of objects, such as object-oriented systems. These systems rely on the concept of specialization which involves classifying specific objects into generic, more abstract classes from which they can inherit properties.

These representational paradigms for computer processes, although applicable to the representation of organizational processes lack the ability to model how processes are related and how processes may be dependent on each other in ways other than prerequisites or data flow type dependencies. More specifically, these paradigms have not been applied effectively in representing interrelationships of processes in a kind of computerized handbook which could be consulted to find a variety of alternative ways to perform particular processes, along with experience and guidelines about which alternatives work best in given situations.

SUMMARY OF THE INVENTION

A method and system for representing processes has been developed to provide a computerized handbook of processes. This handbook can be used for, among other things, teaching, process re-engineering, enterprise modelling, and software development.

A computerized handbook of processes includes a memory in which representations of a plurality of processes are stored. A representation for a process includes indications of processes into which the process is decomposed. At least one of the plurality of processes is a specialization of another one of the plurality of processes, and the representation of the specialization is such that the specialization inherits characteristics from the other process. The handbook also includes a display system including a display. Specializations of a process are accessed from the memory and displayed on the display. A decomposition of a process is also accessed and displayed on the display. The accessing and displaying of decompositions and specializations are provided upon user selection.

BRIEF DESCRIPTION OF THE DRAWING

In the drawing,

FIG. 3 is a graphical illustration of specialization of activities and how related alternative specializations may be bundled;

FIG. 5 is a table of dependency types and example coordination processes for managing the dependencies;

DETAILED DESCRIPTION

The present invention will be more completely understood through the following detailed description which should be read in conjunction with the attached drawing in which similar reference numbers indicate similar structures. All references cited herein are hereby expressly incorporated by reference.

A general explanation of some general concepts underlying the invention will first be provided. The terms "activity" and "process" are used interchangably throughout. In this description, examples are provided by reference to various organizational processes; however, this invention is not limited thereto and is applicable to computer processes.

A process representation has been developed that explicitly represents similarities and differences among a collection of related processes. In order to provide such a representation, notions of inheritance from the field of knowledge representation and concepts about managing dependencies from the field of coordination theory have been exploited. With this representation, a generic process can be represented and more specific processes are represented by simply indicating how they differ from the generic process. Processes are thus represented at many different levels of abstraction along with their relationships to other processes.

In the traditional notion of inheritance, as used in object-oriented programming and knowing representation, objects are defined to create a hierarchical network with general categories at the top and increasingly specialized kinds of objects at lower levels. For example, "Products" might be specialized into categories like "Goods" and "Services", and "Goods" might be specialized into categories like "Automobiles" and "Furniture". At each of these levels, objects may "inherit" characteristics from higher levels, and add or change characteristics from higher levels, and add or change characteristics of their own. For instance, all "Goods" might have a "Weight" and "Size", and "Automobiles" might also have a "Miles per gallon" characteristic.

In contrast to this traditional notion of inheritance, which is organized around a hierarchy of increasingly specialized objects, a hierarchy of increasingly specialized processes has been developed. This notion of process specialization is different from (but complementary to) the conventional notion of process decomposition. In general, decomposition indicates "and" relationships among the processes into which a more general process is decomposed. Specialization indicates "or" relationships among the specialized processes, because the notion of specialization implies that the specialized process is "complete in itself", not just a part of the more general process. Thus, specialization is generally used to indicate alternative ways of performing an activity.

Figure 1:
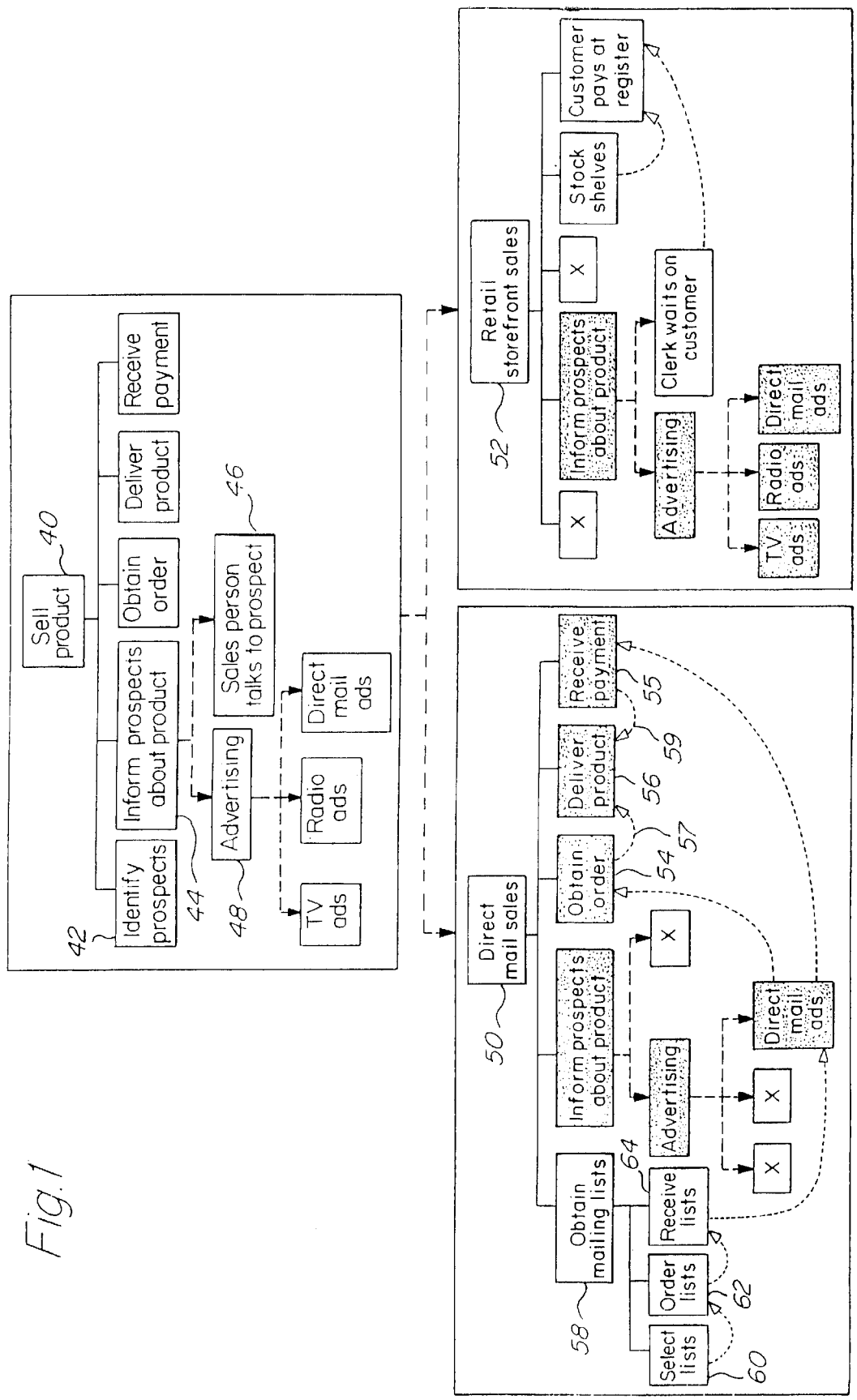
FIG. 1 is a block diagram illustrating the complementary relationship of process specialization and process decomposition.

FIG. 1 shows an example of how decomposition and specialization can work together using the representational scheme which has been developed. FIGS. 2a–f graphically illustrate the different types of possible relationships between activities which are used in FIG. 1.

Figure 2A:
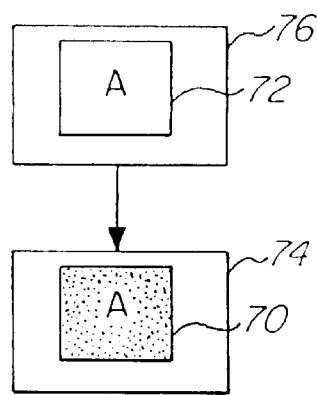
FIGS. 2a–2f are graphical illustrations of the possible relationships between activities represented by one embodiment of this invention.
Figure 2B:
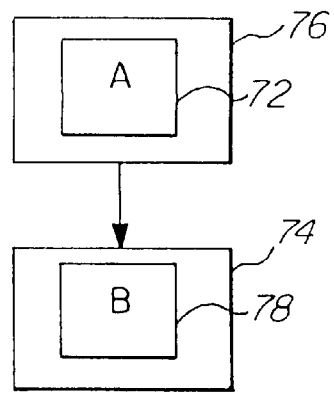
Figure 2C:
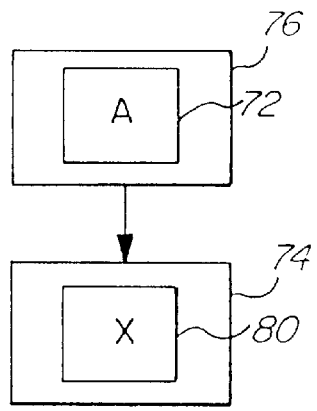
Figure 2D:
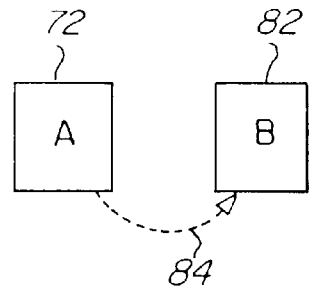
Figure 2E:
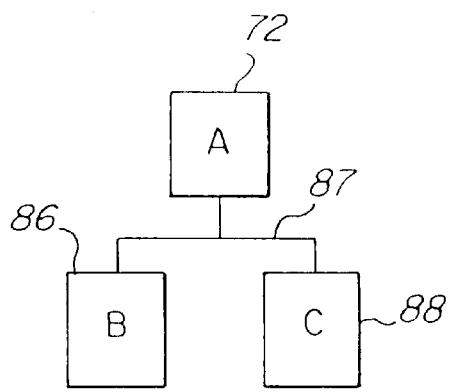
Figure 2F:
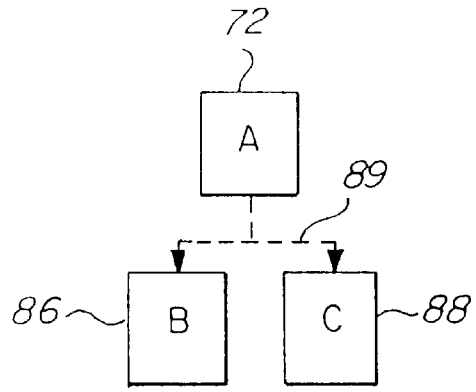

FIG. 2a is a representation of inheritance, where activity A shown in the shaded region 70 is inherited by a specialization 74 from a more generic process 76 in which the activity A 72 appeared in a more generic process 76. FIG. 2b illustrates the relationship where activity B 78 replaces activity A 72 in a specialization 74, where activity A appeared in a more generic process. FIG. 2c shows a relationship where activity A 72 from a generic process 76 is omitted in a specialization 74 as indicated by an "x" in a box 80. FIG. 2d shows a relationship of dependency, where activity A must precede activity B to perform a given process. This dependency may be indicated by an arrow 84. The diagram of FIG. 2e illustrates the relationship where activities B 86 and C 88 are decompositions of activity A. Decomposition may be shown by solid branching lines 87. FIG. 2f shows the relationship where activities B and C are alternative specializations of A. Specialization may be shown by dashed lines with arrows 89. The graphical representations shown in these figures can be used to display these relationships on a computer display.

Therefore, in FIG. 1, the generic activity "Sell product" 40 is decomposed into subactivities like "Identify prospects" 42 and "Inform prospects about product" 44. The generic activity is also specialized into more focused activities like "Direct mail sales" 50 and "Retail storefront sales" 52. These specialized activities automatically inherit the subactivities and other characteristics of their "parent" process. In some cases, however, the specialized processes add to or change the characteristics they inherit. For instance, in direct mail selling the subactivities "obtain order" 54 and "deliver product" 56 are inherited without modification. But "identify prospects" 42 is replaced by the more specialized activity of "obtain mailing lists" 58, and activity of the sales person talking to prospects (at 46) is omitted altogether.

Decomposition and alternative specialization can, of course, be applied to activities at any level. For instance, FIG. 1 shows that "Obtain mailing lists" 58 can be further decomposed into selecting lists 60, ordering lists 62 and receiving lists 64. "Inform prospects about product" 44 can be specialized into "Advertising" 48 or "Sales person talks to prospects" 46.

An activity at any level can also be a specialization of one or more other activities. For instance, in retail storefront sales, "clerk waits on customer" is a specialization of both "inform prospects" and "obtain order", since in many cases, a clerk both informs customers and also convinces them to buy. When an activity is a specialization of two or more other activities, it inherits the union of the subactivities and other characteristics of its parents. This kind of multiple inheritance is useful to represent many actual organizational processes.

Where there are multiple alternative specializations for an activity, it is useful to combine groups of alternative specializations into "bundles" of related alternatives. For instance as shown in FIG. 3, one bundle of specializations for "Sell product" 40 is related to how the sale is made, or the channel 90: direct mail 94, retail storefront 96, or a direct sales force 98. Another bundle of specializations has to do with what is being sold or, the product 92: shampoo 100, computers 102, or cars 104. Other bundles could concern the type of consumers, e.g., hotels, manufacturing companies, and so forth. Bundles are used in at least two ways, comparing alternatives and controlling inheritance.

Alternatives are compared using a tradeoff matrix, which is appropriate only within a bundle of related alternatives. For example, comparing "retail storefront sales" to "selling shampoo" does not make much sense. A tradeoff matrix compares the different alternatives in terms of their ratings on various goals. This tradeoff matrix can also include detailed justifications for the various ratings.

Some discussion of tradeoff matrices can be found in "Sibyl: A Tool For Managing Group Decision Rationale" in *ACM Conference on Computer Supported Cooperative Work* (CSCW'90), Los Angeles, Calif., 1990, by J. Lee. In some tradeoff matrices, the comparisons are the result of systematic studies; and others, they may be simply rough guesses by knowledgeable managers or consultants, with appropriate indications of their preliminary nature. Of course, in some cases, there may not be enough information available to include and comparisons at all.

Figure 4:
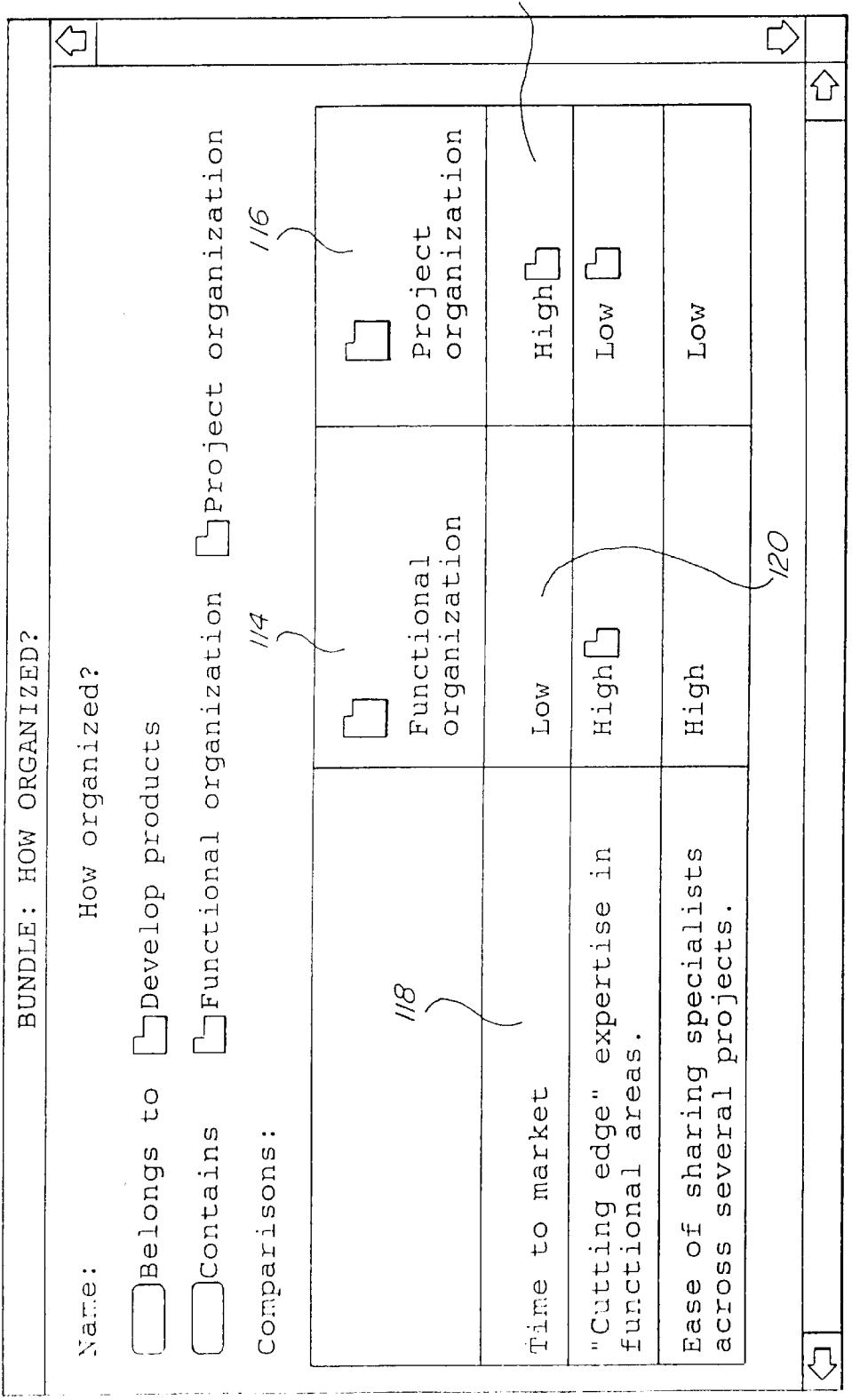
FIG. 4 is a graphical illustration of an example tradeoff matrix.

FIG. 4 shows a sample tradeoff matrix 113 for a bundle containing two alternative specializations for the generic product development process, functional organization 114 and project organization 116. The tradeoff matrix in this bundle shows typical advantages and disadvantages of group and product development teams organized by by functional specialty or by project such as time to market 118, for which functional organization rates low as indicated at 120 and project organization rates high as indicated at 122. (FIG. 4 is also a suitable screen image for displaying a tradeoff matrix).

Alternatives in a bundle should also automatically inherit alternatives from the other bundles but not the other alternatives in their own bundle. For instance, it makes sense for someone selling shampoo to be automatically presented with alternatives for direct mail, retail storefront, and telemarketing, but it does not make much sense for this person to be automatically presented with alternatives of selling computers, newspapers, and consulting. Users who identify their interest as selling shampoo could also always move up to the more generic activity of "Sell product" 40 to see other possible products. Thus it also follows that unrelated bundles (an further specialize each other. Thus the bundle "Channel" 106 can be a specialization of the activity of selling computers 100. It is also possible that a certain specialization, e.g. direct mail 108, as applied in such a context, may be different from the more general activity of direct mail selling 94. Thus, contextual inheritance may be defined. This allows a user to view how the "same" activity is performed in different contexts.

This method of representing processes using a combination of decomposition and alternative specializations has a number of significant benefits over previous process representation techniques. First, it can be substantially reduce the amount of work necessary to represent a new process. By simply identifying a more general process that the new process is intended to specialize, most of the information about the new process can be automatically inherited and only the changes need to be explicitly entered. Second, changes made at a high level can be automatically inherited by more specialized processes, thus greatly simplifying the process of maintaining the process descriptions. Third, by explicitly representing alternative processes and their relative advantages and disadvantages, the task of selecting appropriate processes is facilitated. Fourth, by arranging the alternative processes in a specialization hierarchy, the process of finding, combining, and generating relevant alternatives is greatly enhanced.

Furthermore, depending on their goals, users of the system can browse at various levels of abstraction, finding alternatives that are related according to the principles embodied in the specialization structure, For instance, merely collecting descriptions of how different companies sell consulting services would probably identify numerous examples of direct sales and perhaps mail advertising techniques. The specialization hierarchy described above, however, would quickly lead users who were interested in more radical alternatives to consider options like retail storefront selling, even if no cases of consulting firms using this method had been observed. Thus, the system helps users generate new alternatives by creating new specializations of alternatives at higher levels of abstraction.

Assuming that all processes can be decomposed into a set of activities (e.g., "steps", "tasks", or "subprocesses"), a process representation can be further enhanced by characterizing different kinds of dependencies between activities and identifying the coordination processes that can be used to manage them.

As an example, FIG. 5 is a table which shows how types of dependencies 130 can be associated with different types of coordination processes 132. For example, shared resource constraints 134 can be managed by a variety of coordination processes 136 such as "first come/first serve", priority order, budgets, managerial decision, and market-like bidding. This list is not intended to be exhaustive. If three job shop workers need to use the same machine, for instance, they could use a simple "first come/first serve" mechanism. Alternatively, they could use a form of budgeting with each worker having pre-assigned time slots, or a manager could explicitly decide what to do whenever two workers wanted to use the machine at the same time. In some cases, they might even want to "bid" for use of the machine and the person willing to pay the most would get it.

As the table of FIG. 5 suggests, some dependencies can be viewed as specializations of others. For instance, task assignment 138 can be seen as a special case of allocating shared resources 134. In this case, the resource being allocated is the time of people who can do the tasks, implying that the coordination processes for allocating resources in general can be specialized to apply to task assignment.

In other cases, some dependencies can be seen as being composed of others. For instance, producer —consumer relationships 140 are often composed of at least three other kinds of dependencies: prerequisite constraints 142 (an item must be produced before it can be used), transfer constraints 144 (an item must be transferred from the place it is produced to the place it is used), and usability constraints 146, (an item that is produced should be "usable" by the activity that uses it). Each of these different kinds of dependencies, in turn, has different processes, as listed in column 132, for managing it.

By identifying various types of dependencies possible between activities and the associated coordination processes for managing them, several representational benefits can be obtained in a computerized handbook, specifically conciseness and generativity.

A more concise representation of processes is possible because, instead of explicitly listing all the coordination activities separately in each different process, it is merely indicated that the dependency between two activities is managed by an instance of a particular coordination process.

For example, FIG. 1 shows one very important kind of dependency between activities, prerequisite constraints. Note that no prerequisites are shown at the generic level of "Sell product" 40, suggesting that the generic activities can, in principle, be performed in any order. The specializations of "Direct mail sales" 50 and "Retail storefront sales" 52, however, both include prerequisite constraints between activities. For instance, in direct mail sales 50, it is assumed that the order 54 and the payment 55 must both be received before the product is delivered 56, as indicated by arrows 57 and 59.

Figure 6:
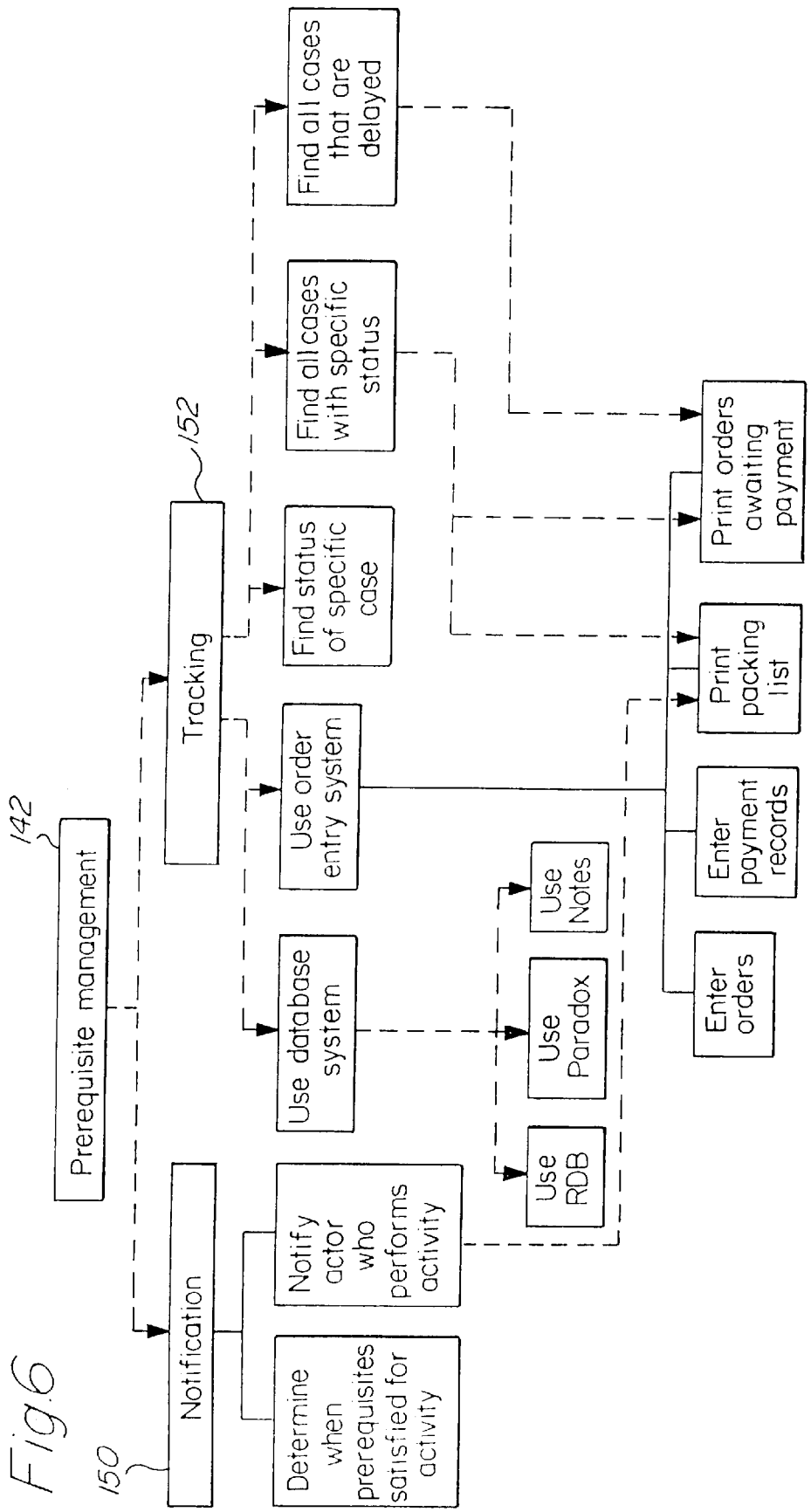
FIG. 6 is a block diagram illustrating a specialization and decomposition hierarchy of the coordination processes of prerequisite management.

Referring to FIG. 5, prerequisite dependencies can be managed, in part, by processes of notification 150 and tracking 152. FIG. 6 suggests further decompositions and specializations of these processes. As an example, a typical order entry system specializes both a notification process and a tracking process. When an order entry system prints a packing list of orders ready to be shipped, it notifies the packers that the prerequisites for shipping have been fulfilled and it helps managers track the orders for which payments have been received but have not yet been packed.

By developing generic process representations for each of the coordination processes listed the table of FIG. 5, and by extending FIG. 6 to include many more dependencies and the coordination processes, it is possible to represent concisely much of the coordination activity that occurs in organizations as specializations of these generic processes.

This process representation also helps generate new possibilities for coordination processes. That is, if there are several coordination processes for managing a given dependency, then they all can be generated automatically as possibilities for managing that dependency in any new process to be considered. Some of these possibilities may be new or non-obvious, and their generation requires no specific knowledge of the process other than the type of dependencies the process involves.

For example, FIG. 1 shows prerequisite relationships among the subactivities of obtaining mailing lists 58: selecting 60, ordering 62, and receiving 64 the lists. Based only upon the existence of these prerequisite relationships, the table of FIG. 5 suggests that the designers of this process should consider how to track the status of various mailing lists that have been ordered. The table of FIG. 5 also suggests alternatives for how to do this tracking, including various kinds of database systems.

Note that a system preferably generates only alternatives that are "sensible" according to the constraints reflected in the system, but it should not rule out alternatives that are inappropriate because of other factors. Instead, the process representations should be organized so that human users can quickly scan numerous alternatives, all of which have some relationship to the situation being considered, but many of which can be quickly eliminated. By systematically presenting related alternatives, the system will often surprise its users with possible, but non-obvious, alternatives they might not have considered.

Having now described some general concepts underlying the present invention, a specific embodiment will now be described. A computerized handbook of processes implementing the foregoing concepts should have the following functional specifications.

Concerning process representation and storage, a representation of processes/activities should permit a significant amount of information (text) to be associated with them. The representation should also have the ability to relate processes (e.g., by using links) in a hierarchical network with lower levels of processes inheriting characteristics of higher level processes. Single and multiple inheritance should be possible. Furthermore, the representation should have the ability to create dependencies between processes and associate these dependencies with coordination processes for managing them.

A suitable computerized handbook should also have adequate display functionality to allow various users to query the handbook and analyze and identify processes. For example, the system should have the ability to view/zoom into a decomposition and specializations of individual activities, for example in the form of a flowchart. It should also have the ability to view user-defined attributes, date modified, etc. It should also be able to navigate to any random process by various search criteria, such as process name. If a unique name is assigned to each process, one should also be able to view all specifications of a process, or to a specified depth. For example one could also view the decomposition of a process to a given depth, or conversely the parents of a process to a given height from which the process inherits its characteristics. Finally, one could also view where a process is used as a subtask. Other information, e.g., dependencies, may be retrieved implicitly via the above operations, or else via additional operations.

Editing functionality of the system is also important. A user should be able to add, modify, delete and reorganize processes including their attributes, specializations, decompositions, and dependencies. This editing should be based on user selected parameters, such as a parent of a given process. The system should also be able to propagate, using inheritance, all attributes of higher levels to the new process, to allow for selection of multiple parents, and thus multiple inheritance, to allow aggregate specialization of process, and to combine processes, modify dependencies, reassign processes for managing dependencies.

Finally, a system should have evaluation and interpretation functionality. That is, it should have the ability to view bundles of alternative activities associated with process and associated comparison of advantages and disadvantages which might be represented, for example, by tradeoff matrices or decision trees. It may also be beneficial to develop heuristics/algorithms for interpreting and evaluating processes or functional flow and for creating work flows/ simulation from process decompositions.

Figure 7:
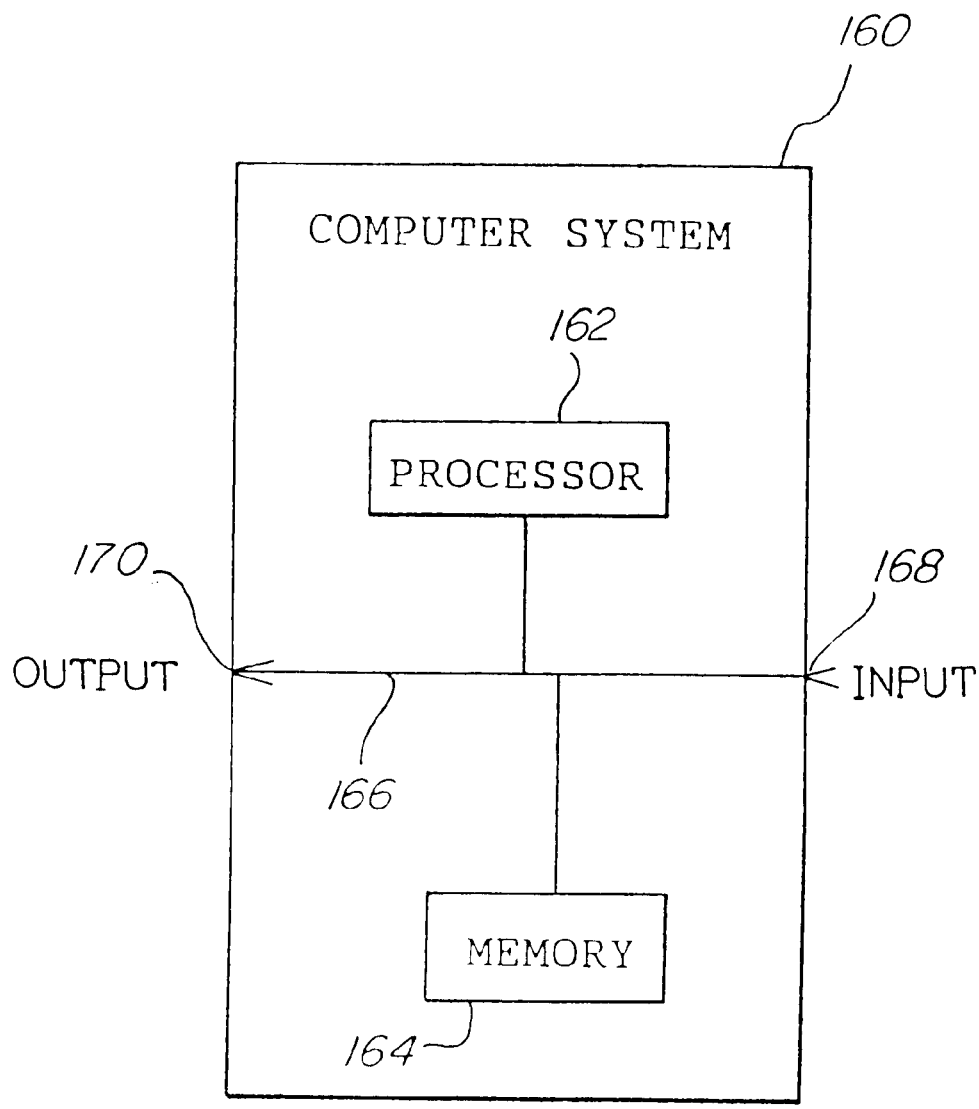
FIG. 7 is a block diagram of a typical computer system which is suitable for implementing the present invention.

FIG. 7 shows a general block diagram of a system which is suitable for implementing the present invention according to the above-described functionality. A computer system 160 includes a processor 162 and a memory 164 interconnected on a bus 166 to which input devices 168 and output devices 170 may be connected. Suitable input devices include a keyboard, trackball, mouse, etc. A suitable output is either a printer or a video display. A suitable computer system is a personal computer including an i286 or later processor available from Intel, such as an IBM PC/AT computer or compatible, with 640 KB of random access memory or higher, 2megabytes or more of hard disk space, a disk operating system (DOS) such as MS-DOS Version 3.0 or higher and Microsoft Windows Version 3.0 or higher. It should be understood that this system is meant to be merely illustrative, and not limiting. Many other computer systems may be used to implement the present invention. A program implementing this invention can be written using the KAL application language, part of the KAPPA-PC Application Development System, available from Intellicorp, Inc. of Mountainview, Calif. The following description is based on such an implementation. This application was selected because of its ability to allow a user or program to dynamically add slots in an object and not merely alter values of those slots. Most compiled object-oriented languages available at this time do not have such capability.

Other commercially-available tools may also be suitable to implement this system. For example, Notes, available from Lotus Corporation, may also be used. It has two advantages: a shared database and the automatic entry of process data gathered using Notes forms. One obstacle is the absence of a straightforward way to effect automatic inheritance. Classes may be modelled by Notes documents, and inheritance may be modelled by the response mechanism, thus supporting only single inheritance. Also, the Notes outline view would be the only means of browsing the handbook, and thus it would not clearly show dependencies, bundles, and other associations. A network view of documents and their links is preferable. Other tools may also be integrated into the on-line process handbook to enhance the handbook with the functionality and features such tools, without requiring the effort to implement these features. It is possible to store static representations of processes in a standard form which could be read by other applications, such as CASE tools, flowcharting systems, simulators, etc. A representation based on KIF (Knowledge Interchange Format) developed by the Interlingua Working Group under the U.S. DARPA Knowledge Sharing Initiative may be suitable for this purpose. These applications could also be used to browse the process handbook, but not edit it. For example, Excelerator, available from Intersolv, is an OS/2.21 CASE product which can also support the proposed representation model, as well as provide a sophisticated user interface that includes flowchart views, data flow views, state machine views, and the like. The interface of this product is customizable using the Excelerator Customizer, which uses SmallTalk as a scripting language. This product would be primarily suitable for a user interface.

Figure 8:
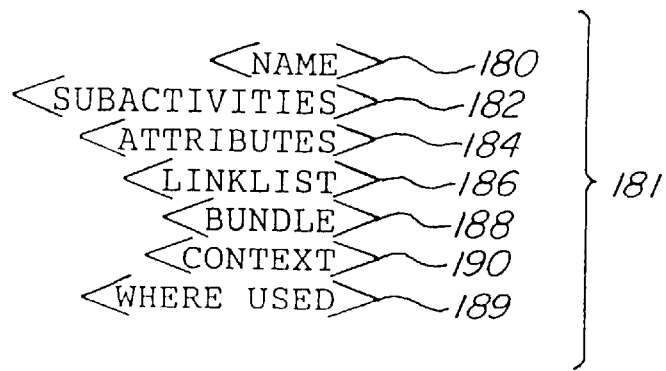
FIG. 8 is a diagram showing the data structure of an activity object.

In an object oriented system like KAL, a process can be represented by a number of objects. A first kind of object is called an activity. Each process is defined by a separate activity class. All activity classes have a similar structure such as shown in FIG. 8. That is, each activity object 181 has a slot for a name 180, such as "sell product". It also includes a slot for a reference to a subactivity object which indicates the subactivities 182 which define the decomposition of the process. The subactivity object will be described in more detail below. It also includes a slot has a reference to an attribute object which indicates the attributes 184 of the process. Attribute objects will also be discussed in more detail below. A reference to a link list object 186 is also provided, which is a list of slots each referring to a link (to be described below) which represents a dependency present in the decomposition of the activity. Two other slots are also provided in each activity object 181 which are binary indicators. The first slot for bundles 188 indicates whether the activity is a bundling object. A context slot 190 contains a reference to an activity for which contextual specialization are defined. The use of these last two slots will be described in more detail below. This implementation of bundles and contexts is merely illustrative. There are many possible ways to implement these features. Each activity also has a "where used" slot 189 which indicates the activities of which it is a subactivity. When a subactivity is added in a decomposition of another activity, a reference to that decomposition parent activity is placed in the "where used" slot of the subactivity. When a subactivity is removed from a decomposition of another activity, the reference to the other activity is removed from the "where used" slot of the subactivity.

Figure 9:
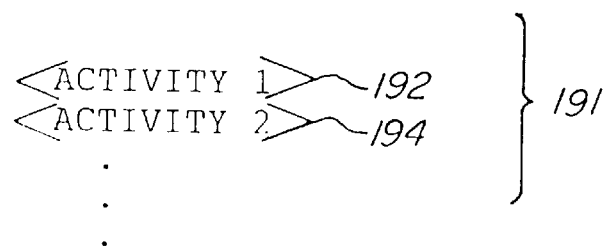
FIG. 9 is a diagram showing the data structure of a subactivity object.

FIG. 9 illustrates the subactivity object 191 such as would be referred to by slot 182 of an activity 181. A subactivity object 191 contains slots 192 and 194, each referring to an activity object which is a subactivity of the parent activity. Thus, the activities referred to in slots 192 and 194 define the decomposition of the parent activity.

Figure 10:
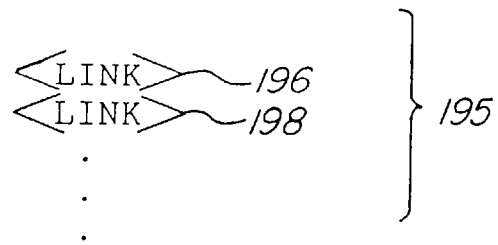
FIG. 10 is a diagram showing the data structure of a link list object.
Figure 11:
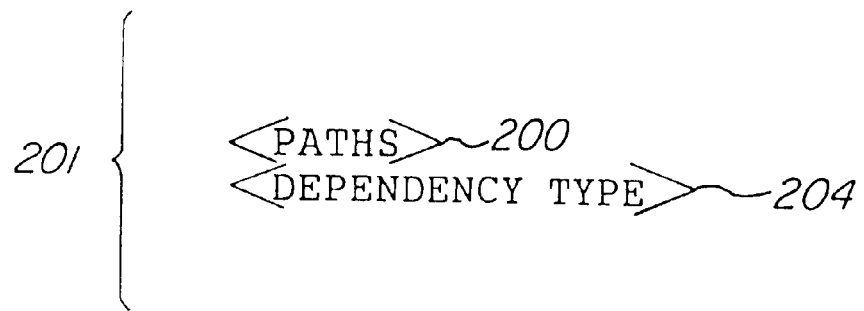
FIG. 11 is a diagram showing the data structure of a link object.

FIG. 10 illustrates the structure of the link list object type 195. A link list object 195 contains a list of slots, each referring to a link object 196, 198 which represents a dependency link present in the decomposition of the parent activity. Link objects will be described in more detail now in connection with the FIG. 11.

A link object 201 includes a paths slot 200 which is an ordered list of references to path objects (defined below). The semantics of the ordering are dependent on the dependency type, e.g., the ordering defines direction for a prerequisite type of dependency. Another slot is defined in a link which refers to the dependency type 204. This reference is to another object called a dependency object which will be described in more detail below in connection with FIG. 13.

Figure 12:
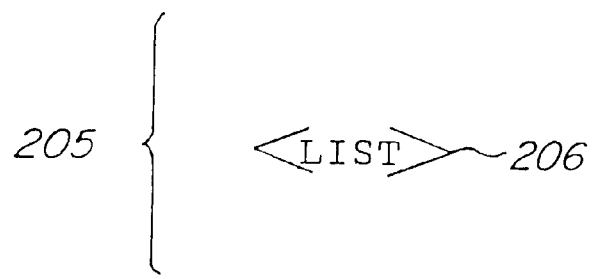
FIG. 12 is a diagram showing the data structure of a path object.

A path object 205 will now be described in connection with FIG. 12. A path object 205 has one slot 206 which is an ordered list references to activities which make up the path from the activity, up the decomposition to the closest common ancestor.

Figure 13:
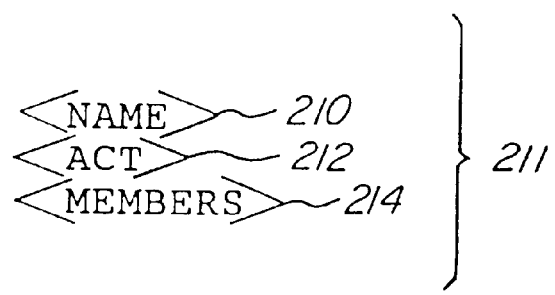
FIG. 13 is a diagram showing the data structure of a dependency object.

The dependency object 211 will now be described in connection with FIG. 13. This type of object includes a slot indicating the name 210 of the kind of dependency. A reference to an activity subclass corresponding to the most generic managing process for this dependency type is referred to in slot 212. Finally, a slot 214 refers to the number of members which this dependency type manages. Most prerequisite types of coordination processes have only two members, whereas producer-consumer relationships can involve an undefined number of members.

An attribute object, not shown in any drawing, is a list of slots, each representing a user defined attribute of an activity. Thus, a user, that is one who is inputting data into the process handbook, can define attributes of different activities. These attributes are used in conjunction with the tradeoff matrices. They may also provide text descriptions of various activities. It is through use of these attribute objects that large amounts of text can be stored in the system.

Figure 14:
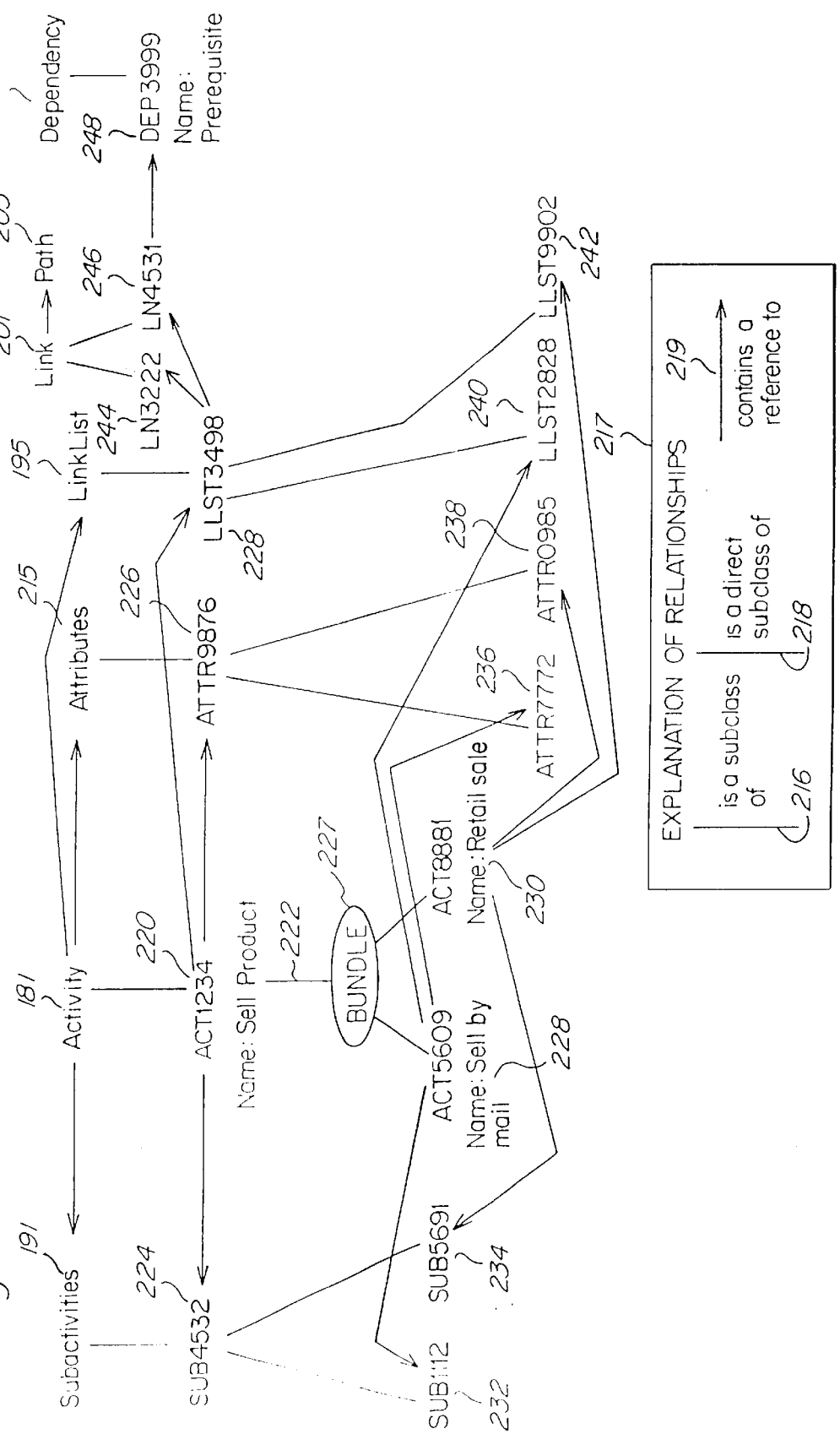
FIG. 14 is a diagram illustrating the object hierarchy defined by a process representation used in one embodiment of this invention.

FIG. 14 describes in more detail the overall interconnection of these object classes and how specific processes are represented with object classes. In general, there are the main classes of objects of activities 181, subactivities 191, attribute 215, link lists 195, links 201, paths 205, and dependencies 211. These most generic classes are the most generic objects of which all other processes become subclasses, which subclasses inherit all slots and their values from parent classes.

In the drawing in FIG. 14, a class-subclass relationship is indicated by a narrow line 216 such as shown in the legend 217. A direct class-subclass relationship is indicated by a darker line 218, for example as shown at 222 in FIG. 14. A narrow line 219 indicates that an object, such as activity 181 contains a reference to another object, such as a link list 195.

A specific process is thus a subclass of an activity 181. As shown in FIG. 14, the activity "sell product," given an identifier "ACT1234" shown at 220, thus inherits all the characteristics of a generic activity 181, and refers to subclasses of the objects referred to by the generic activity 181.

This object 220, named "sell product", contains a reference to subactivity objects 224, attribute objects 226 and link list objects 228. Each of the specific objects 224, 226 and 228 inherit the slots and values from their parent objects which are respectively subactivities 191, attributes 215, and link lists 195. A bundle 227 is a direct subclass of the activity for which the bundle is defined. Thus, it inherits all of the slots and values of the main activity 220, but the name 180 and the bundle 188 slots have changed values to indicate that this is a bundle and defines, via the name 180, what the bundle indicates. Accordingly, the bundle 227 also has references to the same subactivity attribute and link list objects which are referred to by its parent object. The arrows indicating these relationships are not shown in FIG. 14.

Specializations of an activity are therefore subclasses of a more generic activity. If specifications are bundled together, they are direct subclasses of an appropriate bundle subclass of the more generic activity. In particular, selling by mail and retail sale activities, indicated at 228 and 230 in FIG. 14 are direct subclasses of the bundle 227 which is also a direct subclass of selling a product 222. The subactivities of each of these specializations are also subclasses of the subactivity object defined for the more generic activity, as indicated at 232 and 234. The activities 228 and 230 also have specialized attributes and link lists 236, 238, 240, and 242, respectively, which are subclasses of the attribute and link lists 226 and 228, respectively, of the more generic activity.

Links 244 and 246, subclasses of the general link object 201 are referred to by a more specific link list object 328. Furthermore, a dependency type 248, as shown in FIG. 14 as representing a prerequisite type of dependency, is a subclass of a generic dependency 211 and is referred to by link 246.

Contexts are similar to bundles in the object hierarchy, although they are not illustrated in FIG. 14. A context is a special kind of bundle which indicates that all specializations under the context are different variations of the parent activity as defined in different contexts. The underlining specializations, and their context field, indicate the name of the context in which they are used. For example, if the subactivity of "inform prospects about product" 44 were different for the "direct mail sales" activity, a bundle given the name of context would be created for the "inform prospects about product" activity 44. The activity of informing prospects about the product in the context of direct mail sales 50 would then be a specialization of that bundle. The context slot in that specialization would then have the name "direct mail sales". The usefulness of this construct will be described in more detail below in connection with the use and input of the handled data.

Thus, in this representation of a process, more generic processes are represented by more abstract classes of objects and specializations are subclasses; decompositions are references to other activities. The result is that the object hierarchy defined by the system defines the specialization hierarchy of the processes in the process handbook. If a module dependency diagram were to be developed for the objects in this object hierarchy, it would indicate where each activity is used in decompositions of other activities. It should be understood that the foregoing description is not intended to limit the invention to object-oriented systems. Other systems may be used, and the object structures discussed above suggest that information which is tracked and used in a process handbook.

Browsing using the process handbook will now be described in connection with FIGS. 15–19.

Figure 15:
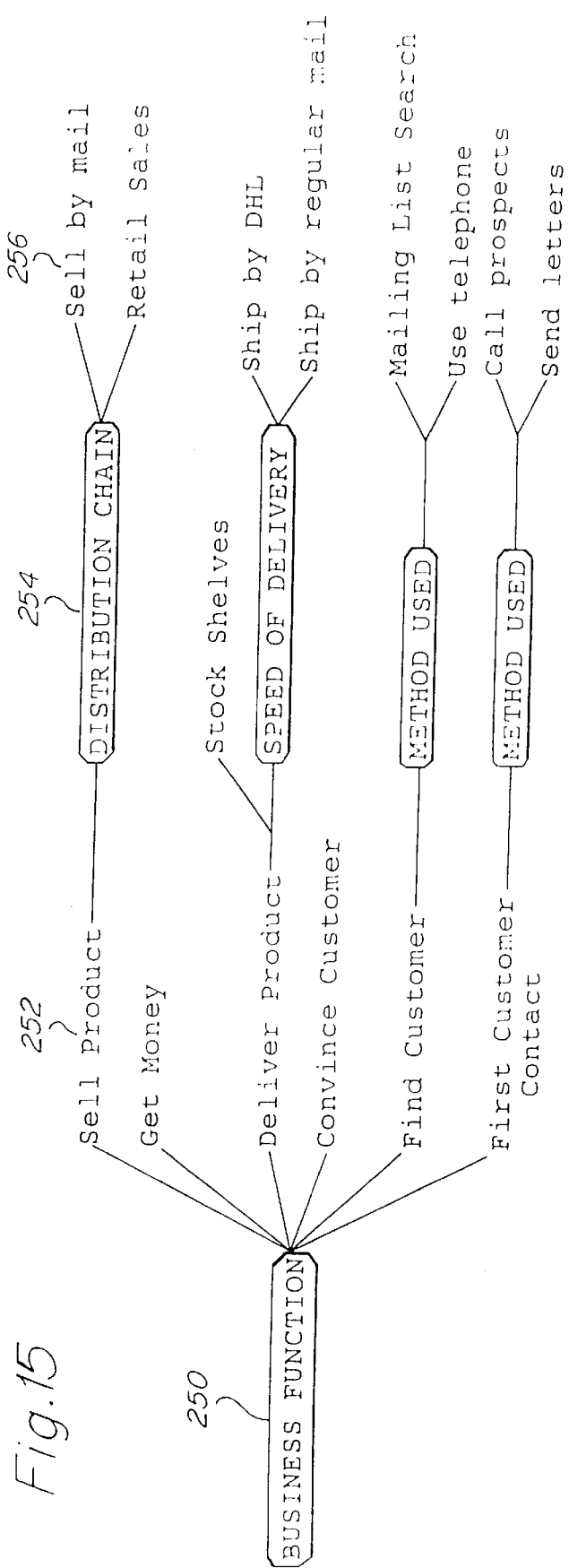
FIG. 15 is a diagram showing another object hierarchy.

Many object-oriented systems provide object browsers which allow a user to view the object hierarchy. By using such a browser, and because the specialization hierarchy of processes is defined by the object hierarchy, many specializations of processes can be shown merely by using this object browser. A sample display is shown in FIG. 15. The capability of the object browser is described in more detail in the *User's Guide*, the *Reference Manual*, and the *Advanced Topics* manuals that come with the Kappa PC product. In particular, reference is made to these manuals for Version 2.0 of the product, as printed in November of 1992.

In FIG. 15, the generic process "business function" 250 is specialized into, in this example, six other processes indicated at 252. Each of these processes is further specialized into processes indicated in the column at 254. Similarly, processes indicated at 256 are further specializations of those shown at 254. Viewing the top processes in each of these columns, we see that selling by mail is a specialization within a bundle called distribution channel which is in turn a specialization of selling a product which is a specialization of a business function. Each of these representations of a process is a specific object class in the system.

Typically, an object browser provides much viewing functionality, including the ability to focus on a specific object as a root object, ignoring all other objects in the hierarchy. Also, the depth of the hierarchy which is viewed can also be controlled. Many of these capabilities are programmable options which can be controlled by appropriate programming in accordance with the instructions provided in the manuals for Kappa-PC. The generation of menus, icons and other appropriate input forms is well within the level of ordinary skill in this at.

With the object browser it is also possible to select a given activity, and to display the module dependency diagram of the activity. That is, an indication of a process can be displayed and its list of subactivities can be traversed so as to identify all of the activities making up its decomposition. Such a display for selling a product has already been shown in connection with FIG. 1. The process of displaying this module dependency diagram for a selected activity involves identifying the subactivity object associated with the activity, obtaining the names of each of the activities listed in the subactivity object and generating the appropriate display. The depth of the decomposition displayed is preferably controlled by the user. For example, a user may select to view a decomposition to the depth of a second level. On the other hand, the system could be designed to display only one level at a time for each individual activity.

Figure 16:
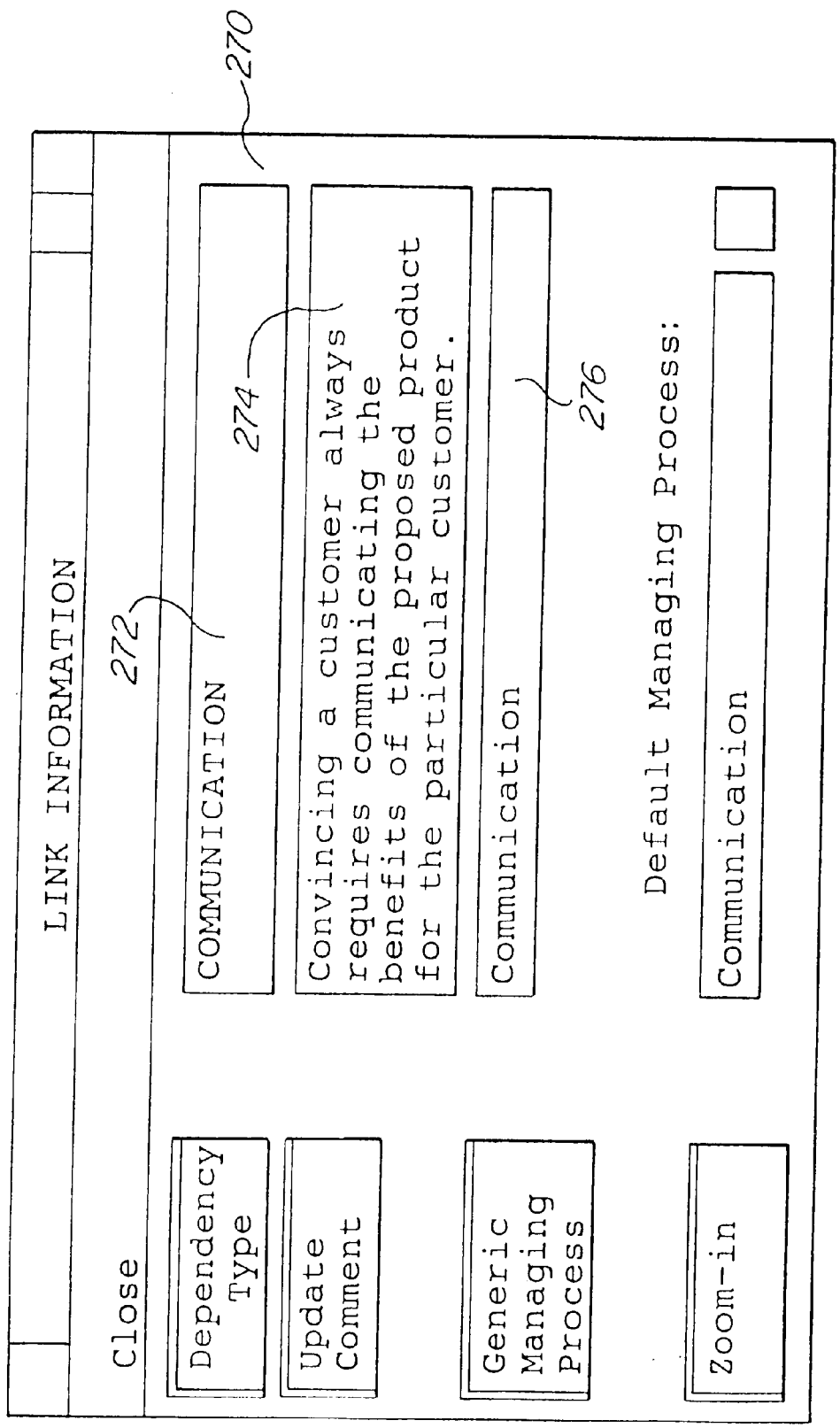
FIG. 16 is an illustration of a computer screen display of link information.
Figure 17:
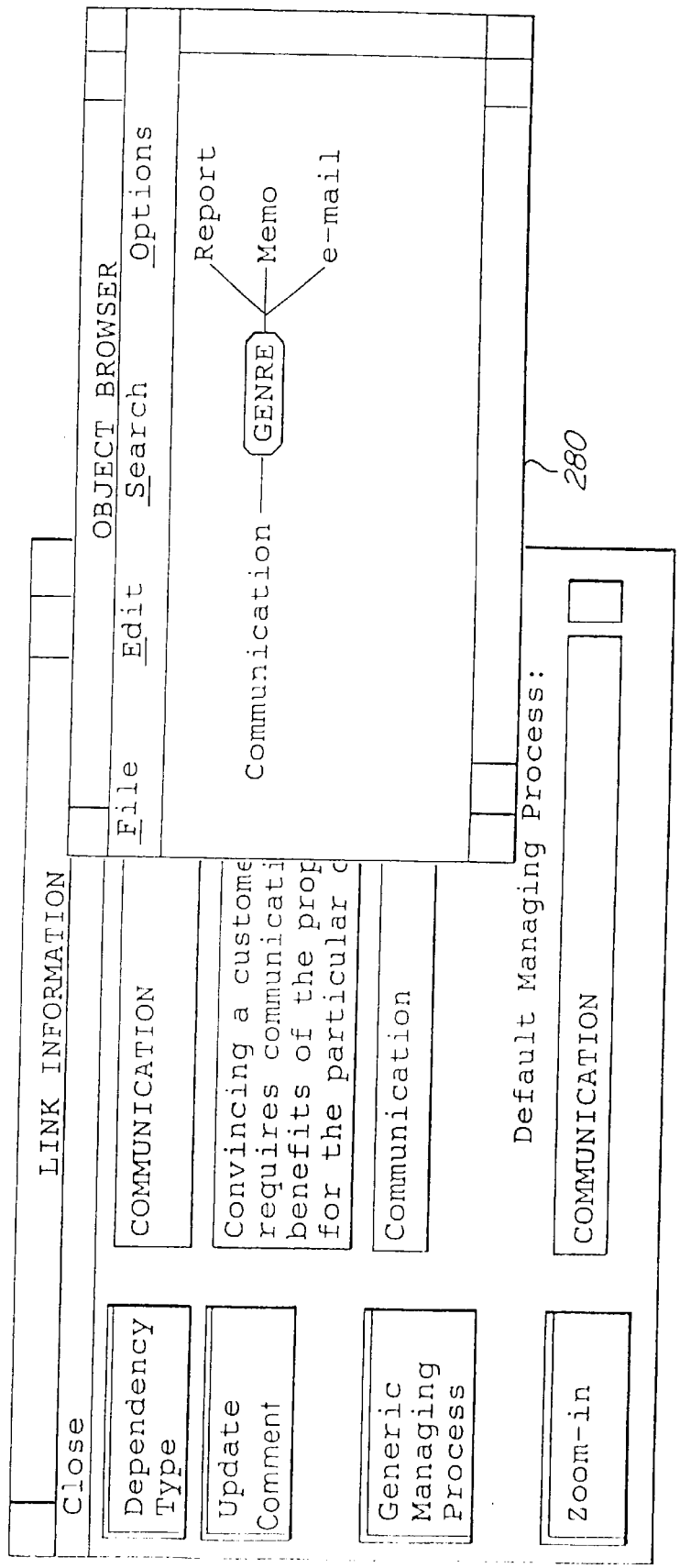
FIG. 17 is an illustration of a computer screen display of a specialization hierarchy for a process for managing a dependency.

It is also possible, at the user's option, to have dependency links displayed. The references in the link list to links and paths are traversed to identify, out of the displayed activities, which activities have dependencies. Furthermore, some information concerning the coordination activity associated with each link can also de displayed such as shown in FIG. 16 in a window 270. The name of the dependency type can be shown such as at 272, along with a brief description of the dependency at 274. An indication of the managing process for the activity can be provided at 276. One could then view the variety of specializations of that generic managing process if the user so desired, such as shown in FIG. 17 at window 280.

Figure 18:
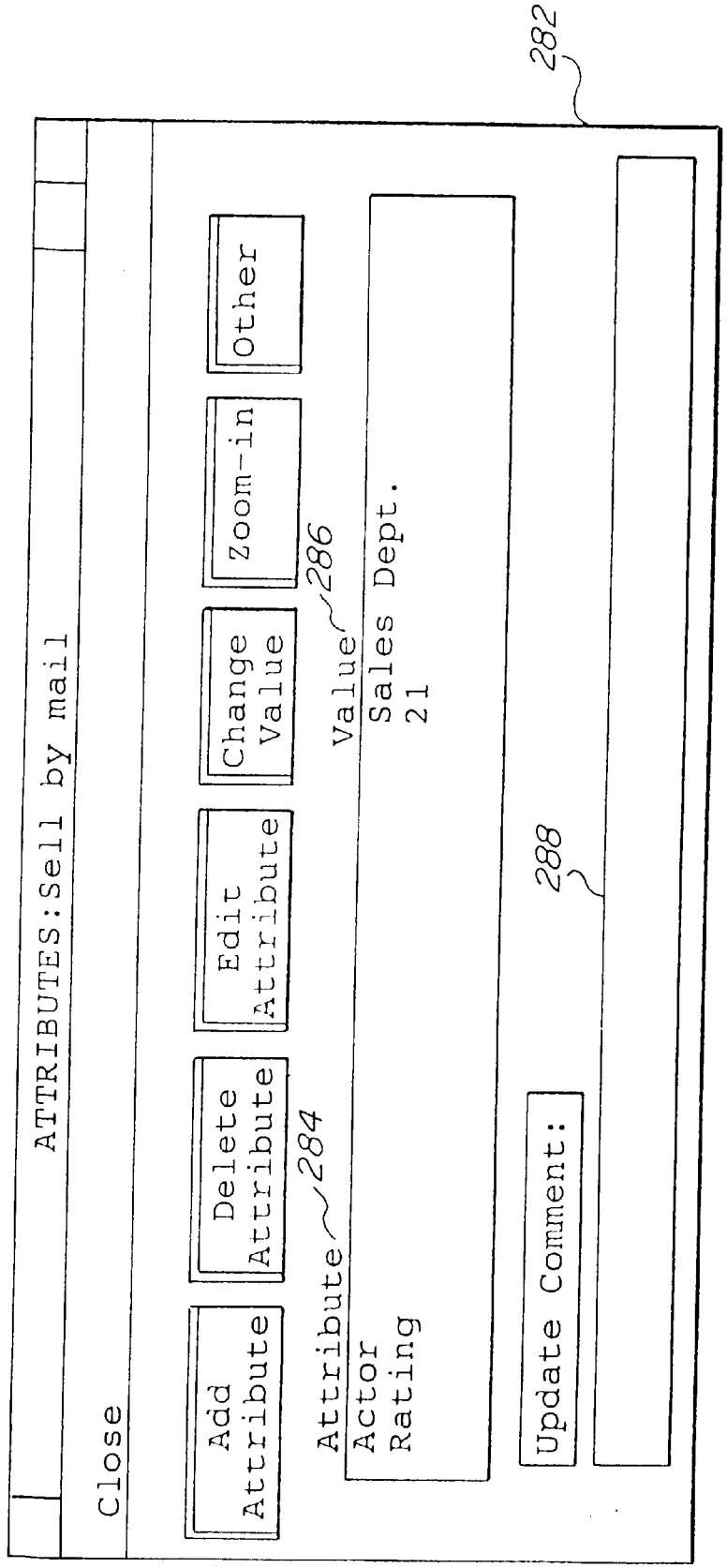
FIG. 18 is an illustration of a computer screen display of attributes of an activity.

The capability for the user to view the attributes of an activity should also be provided. This could be done by a menu function, wherein, in response to a menu selection, the attributes for the selected activity object are retrieved and their names and values are displayed, such as shown in FIG. 18 at window 282. Attribute names can be shown in column 284 and their corresponding values can be shown in column 286. A field can also be provided at 288 for various comments.

Figure 19:
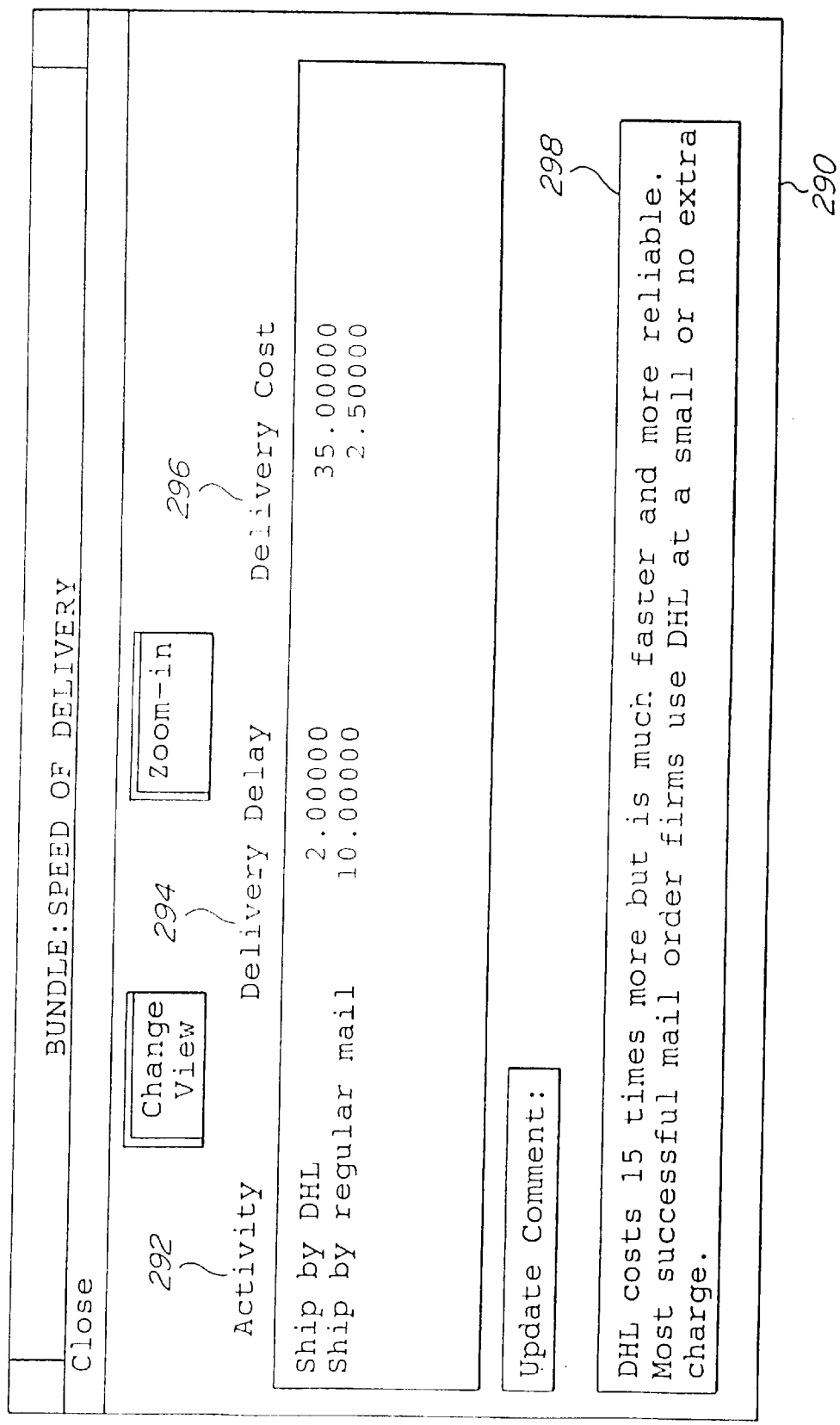
FIG. 19 is an illustration of a computer screen display of a tradeoff matrix for a bundle.

These attributes may also be viewed when viewing a bundle of specializations. For example, when a user identifies a bundle from the object hierarchy, the user can be permitted to view the tradeoff matrix. Such as shown in FIG. 19 at window 290. In this window, the name of each activity in the bundle can be identified in column 292 along with a column for each of a selected subset of attributes such as shown at 294 and 296. The values of the attributes for each activity are then displayed in their appropriate columns, thus enabling one to compare the different activities in the bundle. It is also possible to provide a comment, such as shown at 298 in FIG. 19, which provides some analysis of the tradeoff matrix.

Having now described the various output capabilities for this system, processes for inputting data will now be described. There are primarily the activities of creating, deleting, changing, and moving activities. These may involve renaming activities, adding bundles and specializations. The ability to add, change, move or delete also applies to subactivities, dependencies and attributes. A variety of user interfaces may be provided for performing these functions. There is no specifically preferred way to allow input of the data except that it is preferable to make the input as intuitive as possible.

Figure 21:
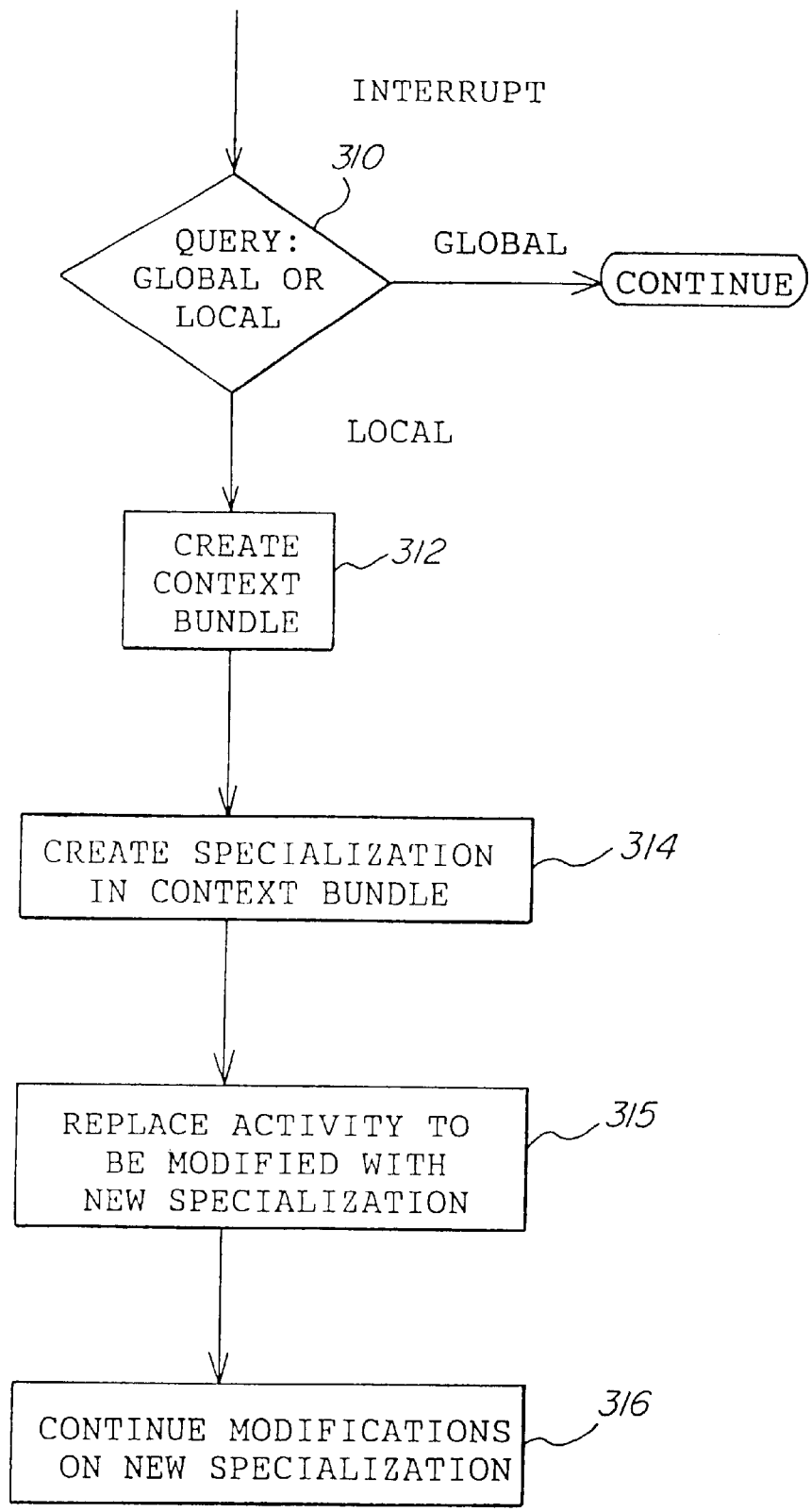
FIG. 21 is a flow chart describing how contexts are created.

Because each activity, and other objects associated with it are all object classes, changing them involves operations of adding slots, creating classes and changing values within slots. For example, creating subactivities, links, attributes and so on simply involves the step of creating an object subclass of the generic class. Once created, these objects can be modified. In the editing process, whenever a modification affects an activity, it should be determined whether that activity is used in more than one other activity. That is, for example, if one were to change the activity of direct mail sales, it should first be determined whether direct mail sales occurs in the decomposition of activities other than selling a product. If it does appear in other decompositions, a process as shown in FIG. 21 should be followed. The detection of multiple use of an activity (performed by examining the whereused slot of the activity) can be treated as an interrupt which causes a query 310 to the user to occur which request the user to indicate whether the change should be global or merely local. If the change should be global, processing continues on the changes to the activity and all of these changes then occur in all of the decompositions in which this activity appears. If the user requests that the change be merely local, i.e., only in the context of the current decomposition being viewed, a context bundle is created in step 312, as a specialization of the original activity which is being modified. A further specialization in the context bundle is then created in step 314. The activity to which a modification is to be made is substituted with this new specialization in step 315. That is, modifications to the activity selected by the user are actually made to the new specialization in the context bundle in step 316.

Operations on activities will now be described.

Subclasses are also created for the objects referred to by the original activity. The newly created specialized activity is then modified to refer to these newly created other subclasses. An exception applies for creating bundles, where only a subclass of the original parent activity is created. The bundle activity still refers to and inherits all of the slots and values of the parent.

Deleting an activity from the specialization hierarchy prompts the user in step 318 as to whether the user would like to attach the children or specializations of the activity to the activity's parent, or more generic activity, or whether all of the specializations or children should be deleted as well. If the children are to be attached, the class hierarchy is moved to be specializations of the parent of the deleted activity, in step 322, using a computer instruction available in the Kappa-PC application language. Otherwise, all of the children are deleted in step 320, also using standard commands that are available.

Figure 22:
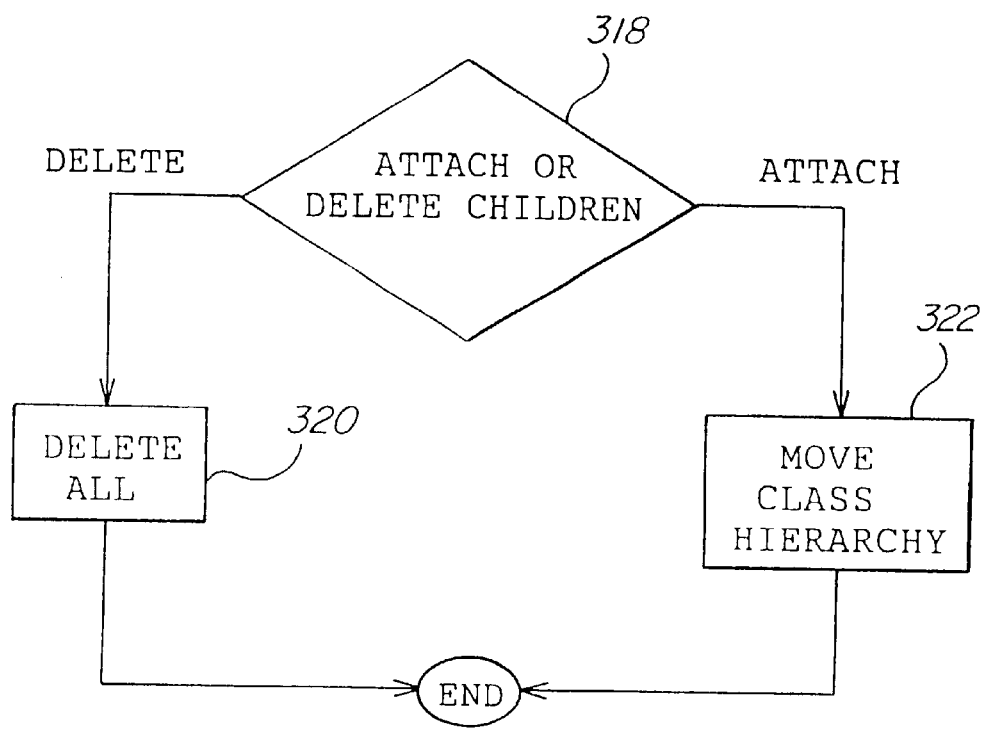
FIG. 22 is a flow chart describing how activities are deleted from the specialization hierarchy.

Moving specializations around in the specialization hierarchy is similar to step 322 of FIG. 22, This capability allows one to redefine how activities are specializations of other activities once activities are entered into the process handbook.

Renaming an activity or any other object used in this system involves changing the value of the slot for the name for that object.

Because Kappa-PC does not support multiple inheritance, this capability is provided by additional structures transparent to the user. If an activity has multiple parents, two specialized activities are created, each as a direct subclass of each of the parents. During display of a decomposition of this specialization, the activity is computed as the union of the decompositions of all siblings. In such an embodiment, each activity has a slot called "siblings" which is a list of all of the direct subclasses of each of the parents that were mentioned above. When a decomposition including one of the generated subclasses is displayed, the union of the two related subclasses is generated and displayed.

Figure 23:
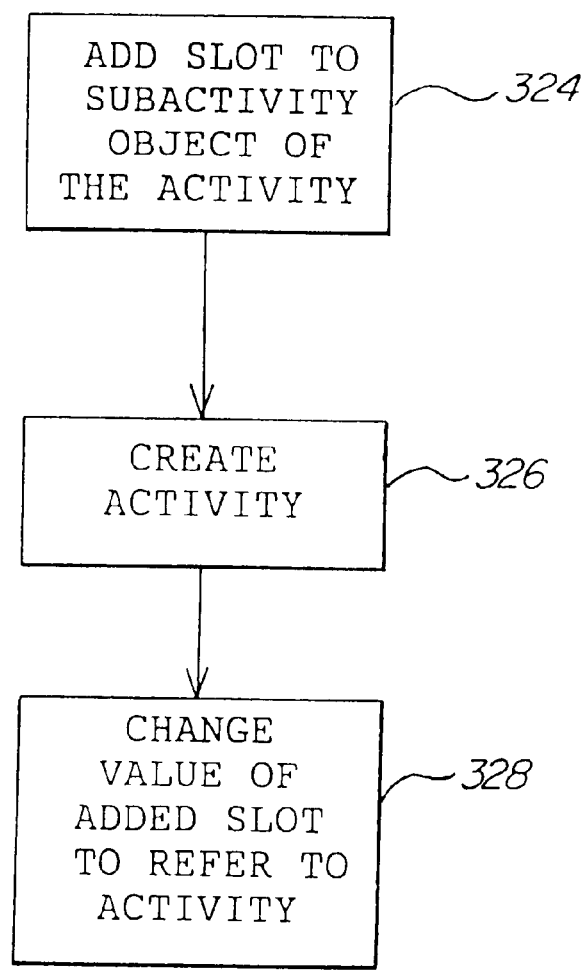
FIG. 23 is a flow chart describing how subactivities are added to an activity.

Operations on subactivities will now be described. These operations involve adding and deleting and modifying and moving. FIG. 23 is a flowchart describing how subactivities are added to an activity. Of course, because an additional subactivity changes the activity of which it is part, the process described above in connection with FIG. 21 should initially be performed before the subactivity is added. After that process is performed, a slot is added to the subactivity object 191 of the activity to which a subactivity is to be added. The activity object for the subactivity is then created in step 326 and a reference to it is placed in the newly created slot in the subactivity object, in step 328.

Deleting, modifying, and moving a subactivity involve related operations. It should be first pointed out that each slot for an object has some other properties besides its value, in particular, status values. These status values can be such that a slot can be marked as deleted or modified, in comparison to its parent object. Also, each slot can be assigned a rank for display purposes. Thus, whenever a slot for an object is deleted or modified with reference to its parent, the status information for that slot is marked as either deleted or modified. Similarly, moving a slot involves changing the respective ranks of the slots. The ranks are used to control the display. The status information is used for deleting and modifying to control the display as well. Thus, it can be indicated where activities in a decomposition of a specialization differ from the decomposition of the specialization parent. For example, the rank values are used to control the order of appearance, for example, from left to right, of the indications of the decompositions in the display, such as shown in FIG. 1.

Figure 24:
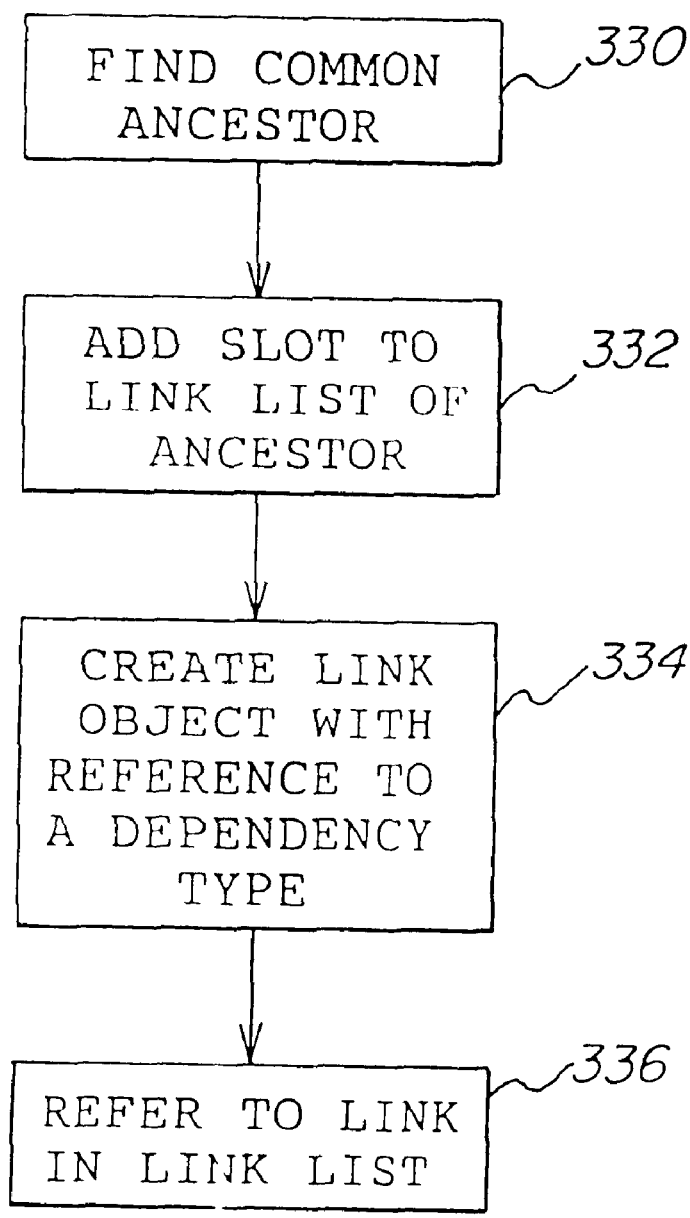
FIG. 24 is a flow chart describing how dependencies are added in a decomposition of an activity.

The addition of links to a decomposition will now be described in connection with FIG. 24. Given two activities the first step of adding a dependency between two activities in a decomposition is a step 330 of finding the common ancestor in the decomposition of these objects. A slot is then added to the link list of the ancestor activity in step 332. A link object is then created with reference to a dependency type in step 334. This step involves generating a path for each of the activities to the common ancestor and identifying, or requesting the user for, an appropriate dependency type. These created objects are then referenced in the link list in the slot which was added in step 336.

To be most useful, a computerized handbook such as described herein should be populated with a substantial number of process descriptions, which are collected in a way that enforces consistency among comparisons of processes in a wide variety of contexts. Thus, suggestions for data collection are the following.

Descriptions should be both consistent with the vocabulary native to a given problem but also common among a variety of situations. As new situations are confronted new kinds of activities will be encountered that are qualitatively different from those described with the existing vocabulary. To accommodate these activities, new categories of activities are created, with the result that the vocabulary grows. As the vocabulary grows the proliferation of terminology should not be allowed to obscure underlying similarities between steps in processes that take place in different contexts.

The vocabulary should also provide levels of abstraction and granularity at which meaningful and useful descriptions can be formulated. In principle, processes could be translated into primitive elements at an extremely fine-grained level. However, previous attempts to codify an appropriate set of primitives have not fared especially well.

Given an appropriately developed handbook including suitable representations of another of processes, an example of how this handbook might be used will now be provided. Assume there is a consultant to a general manager of a new division of a large computer hardware vendor. This vendor has traditionally used a highly skilled direct sales force, but the mission of the new division is to sell personal computers and software by direct mail. A small publishing group has existed in this company for years, distributing documentation and other technical reference material by mail order. This publishing group will also be incorporated into the new division.

The job of the consultant is to help the new manager decide how to staff and structure this new division. Numerous questions may arise such as: should the processes already in use in the mail order publishing group be simply adopted and scaled up? What new problems might arise when these processes are scaled to sales volumes 50 to 100 times what they were? Are there other processes that might be better suited for the volumes, products, and customers targeted? What is the "best practice" among mail order vendors in other industries? Can advanced information technology be exploited to organized a highly efficient mail order service? For instance, would it be possible to guarantee customers overnight delivery of the products they order?

Figure 20:
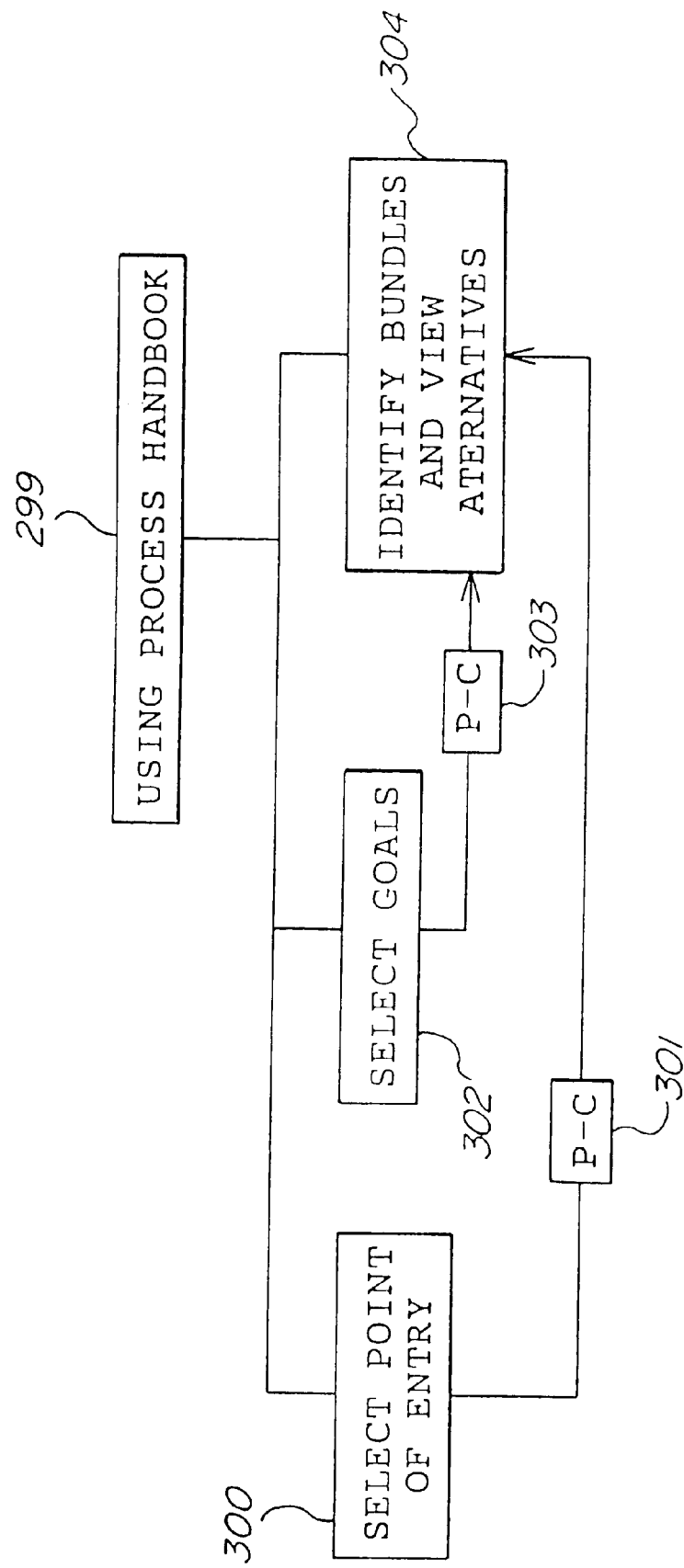
FIG. 20 is a process decomposition diagram of the activity of using the process handbook in accordance with the invention.

In order to investigate such and other questions using the handbook, the following steps could be taken. These steps are also identified as the activity of using the process handbook 299 in the accompanying FIG. 20, using a kind of representation shown and described in connection with FIG. 1.

First, specify the general situation from a list of "generic" processes that are available in the handbook (select point of entry 300). The general situation can be selected at a rather high level of abstraction (e.g., "Selling a product") or a more specific level ("Direct mail sales"). This provides an "anchor" or point of entry into the space of possible processes catalogued in the handbook. Choosing a more generic level opens up a wider range of comparative alternatives, which may or may not be relevant to the objectives.

Second, within that general situation, select specific features or goals of interest (the activity of selecting goals 302). For example, in this case, one constraint is to sell three classes of products: computer hardware, software, and reference material. Two of these products (hardware and software) require a relatively large amount of customer service. Furthermore, as defined above, a very short response time is desirable (even overnight delivery, if possible).

Third, at this point, the handbook retrieves (or generates) a set of alternative organizational forms and displays them in a matrix with each alternative rated in terms of goals such as "cost of sales", "response time", and "quality of customer service". In cases where it is difficult to evaluate an alternative reliably, the range of possibilities or the degree of uncertainty is indicated if the information is input as an attribute for the activity.

Fourth, the handbook also provides a variety of interactive ways to explore, compare, combine, and redesign the alternatives. For example, it is possible to: (a) view a flow diagram for each process, (b) examine the basis for the evaluation on each goal, (c) see "tips" for success in using the processes, and (d) find examples of specific companies that use the processes if such information is provided as attributes in the handbook. For instance, the processes used by Lands End, a widely admired mail order clothing company, might be described along with references to documents and other sources of more information. These third and fourth steps are the activity of identifying bundles and viewing alternatives 304. This activity is in a producer-consumer relationship with both of activities 300 and 302 as indicated by dependencies 301 and 303, respectively.

Fifth, eventually, some of the initial constraints may be relaxed to let the system suggest more radical innovations. For instance, what if the goods were distributed through a new chain of retail stores? What if customers were allowed to place orders through PC-based programs or through touch-tone telephone systems? Would it even be possible for all employees of the division to work at home, or for all the "employees" to work as independent contractors?

Of course, the desirability of these alternative processes will often depend on factors in the actual situation that are not represented in the handbook, and will rely on intelligent users to take these other factors into account. The handbook, however, can help these users systematically examine many possibilities they might never otherwise have considered.

In view of the foregoing it should be apparent that such a process handbook may have different uses, including primarily helping theoreticians imagine new organizations and helping consultants, managers, and others redesign existing organizations. It may also be useful for teaching about organizational activities. Finally, it may also enable the automatic generation of software for coordinating processes.

Of these uses, redesign of organizations has already been discussed. The handbook, because it provides a systematic representation of processes, also can be theoreticians make systematic, empirically-grounded suggestions about possible new organizational processes, especially those enabled by new information technology. This handbook should also be useful for suggesting responses to other environmental changes such as those in employees' skills, legal constraints, or production technologies.

The handbook also may be useful to students at various levels. For undergraduates unfamiliar with basic organizational functions, (e.g., marketing, personnel, accounting, purchasing, sales, manufacturing), the process handbook can provide an interactive overview of various organizations. For more advanced students, it can provide a way of learning about and comparing alternative designs for various organizational functions in different industries. Because it contains a database of processes, and an analytical framework with which to compare those processes, the handbook can also provide a valuable resource for creating and analyzing so-called "best practices".

One of the more ambitious and interesting possible uses of the handbook is automatic generation of software to support the processes represented. For instance, we can imagine that when a group of employees recognizes that they all need to share use of the same machine, they might consult the handbook for a variety of alternative processes for scheduling shared resources (e.g., "first come/first serve", "priority order", "bidding", and "managerial decision"). After the group selects one of these processes and specializes it for their own particular situation, a customized scheduling application could be automatically generated specifically tailored to the needs of this group. Software to support many other workflow processes (such as approval processes, hiring procedures, and equipment ordering methods) might also be easily generated using this approach.

An additional usefulness of this handbook is that the representation described is also applicable to computer processes and suggests the basis of a possible new computer language. In such a language, processes and their decompositions represent computational processes. Dependencies between these processes are managed by coordination processes.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A computerized handbook of processes, comprising:
   a memory in which representations of a plurality of processes are stored, a representation for a process including indications of processes into which the process is decomposed, and wherein at least one of the plurality of processes is a specialization of another one of the plurality of processes, the representation of the specialization being such that the specialization inherits characteristics from the other process;
   a display system including a display, means for accessing specializations of a process from the memory and for displaying the accessed specializations on the display, means for accessing a decomposition of a process and for displaying the accessed decomposition on the display, and means, responsive to user selection, for alternatively operating both said means for accessing.

* * * * *